(12) United States Patent
Selby et al.

(10) Patent No.: US 6,597,411 B1
(45) Date of Patent: Jul. 22, 2003

(54) METHOD AND APPARATUS FOR AVOIDING MOIRE IN DIGITALLY RESIZED IMAGES

(75) Inventors: Steve Selby, Scarborough (CA); Gheorghe Berbecel, Richmond Hill (CA)

(73) Assignee: Genesis Microchip Inc., Ontario (CA)

( * ) Notice: Subject to any disclaimer, the term of this patent is extended or adjusted under 35 U.S.C. 154(b) by 331 days.

(21) Appl. No.: 09/708,499

(22) Filed: Nov. 9, 2000

(51) Int. Cl.$^7$ .............................. H04N 3/22; H04N 5/21
(52) U.S. Cl. ........................................ 348/806; 348/607
(58) Field of Search .................... 348/806, 745, 348/747, 581, 552, 582, 607, 615; H04N 5/21, 3/22, 3/26, 9/74

(56) References Cited

U.S. PATENT DOCUMENTS

| | | |
|---|---|---|
| 5,280,353 A | 1/1994 | Baldwin |
| 5,303,055 A | 4/1994 | Hendrix et al. |
| 5,534,948 A | 7/1996 | Baldwin |
| 5,729,301 A | 3/1998 | Sluyterman |
| 5,764,216 A | 6/1998 | Tanaka et al. |

*Primary Examiner*—Sherrie Hsia
(74) *Attorney, Agent, or Firm*—Staas & Halsey LLP

(57) ABSTRACT

A method and apparatus for reducing the appearance of moiré in a digitally resized image wherein each input pixel value is mapped to a new value by means of a first correction function prior to being resized. At the output of the resizing engine, each pixel in the resized image is mapped to a further new value by means of a second correction function prior to being displayed. The second correction function is chosen such that the intensity of light output from the display device is substantially proportional to the value of the signal from the resizing engine, taking into account the combined transfer functions of the second correction means and the physical display device (i.e. the second correction function is substantially the inverse of the display transfer characteristic). The first correction function is chosen to be substantially the inverse of the second function, resulting in the effect of reducing moiré that would otherwise appear in the presence of high spatial frequencies, while leaving the overall DC transfer characteristic unaffected.

9 Claims, 12 Drawing Sheets

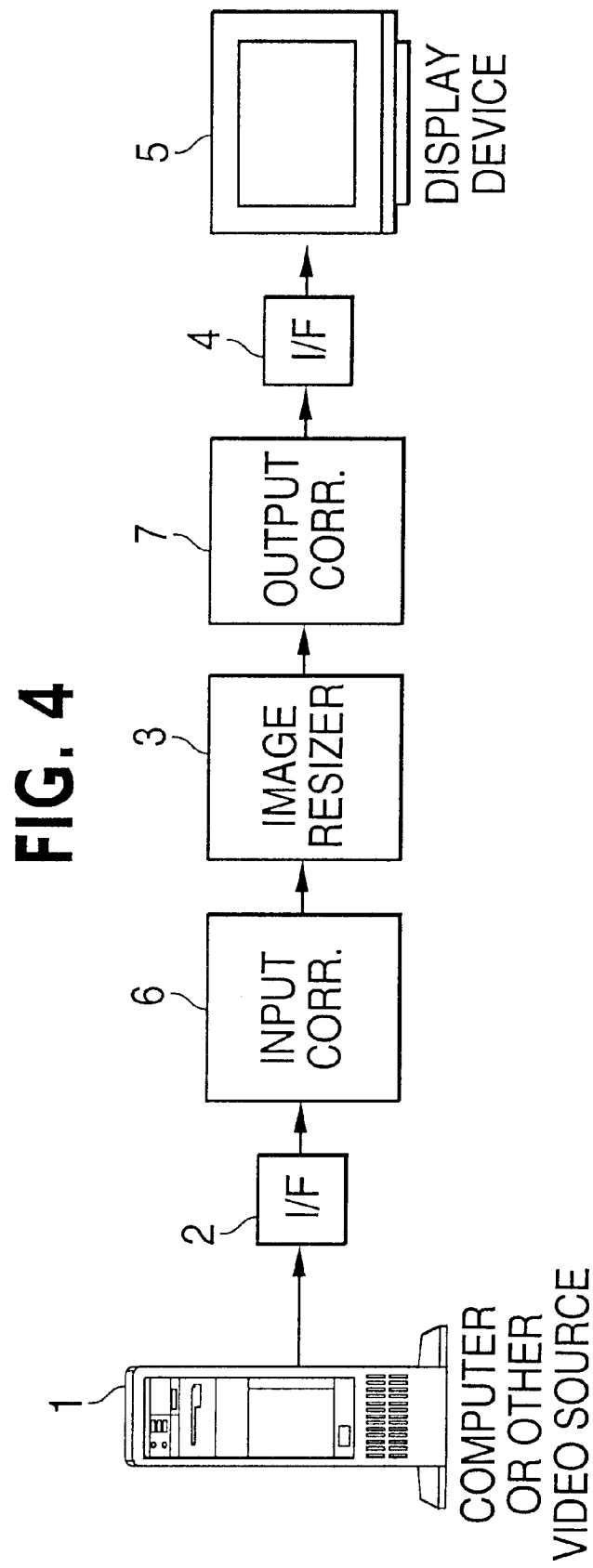

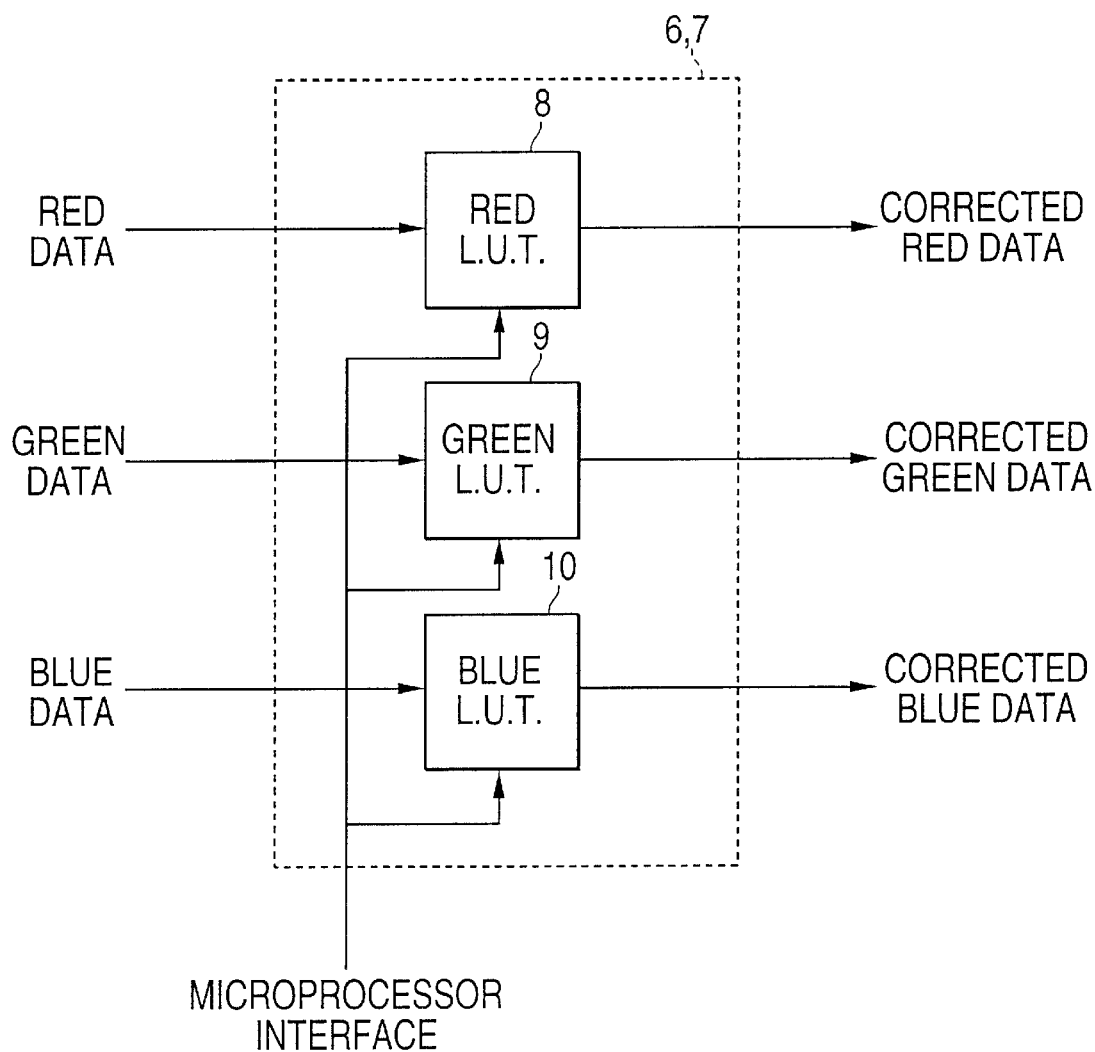

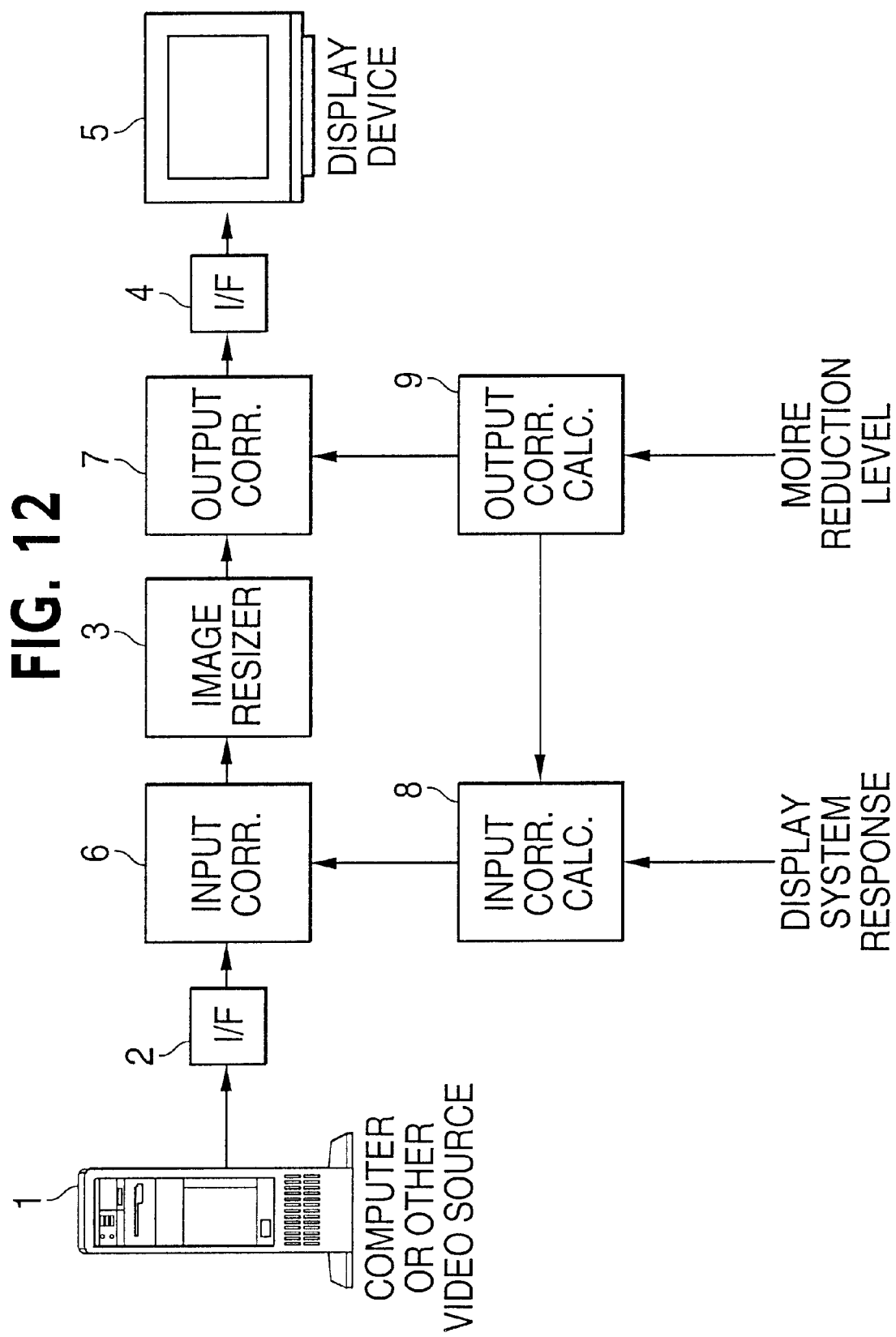

METHOD AND APPARATUS FOR AVOIDING MOIRE IN DIGITALLY RESIZED IMAGES

FIELD OF THE INVENTION

This invention relates in general to digital video signal processing, and more particularly to a method and apparatus for reducing the appearance of moiré in digitally resized images.

BACKGROUND OF THE INVENTION

Cathode Ray Tube (CRT) monitors, particularly those used as computer displays, are usually capable of displaying images at various resolutions, for example 640×480, 800× 600, 1024×768, etc. It is a relatively simple matter to create a CRT monitor that is capable of receiving a video signal at any of the above resolutions and displaying it such that the image fills the screen, regardless of the input resolution. This is possible since a CRT is an inherently analog display device and so an image of any given resolution can be made to fill the screen by appropriately controlling deflection of the electron beam.

Recently, conventional CRT displays have begun to be replaced by digitally addressable display devices such as Liquid Crystal Displays (LCDs), Plasma Display Panels (PDPs) and other technologies. Flat panel monitors employing LCD panels have become popular as replacements for CRT based computer monitors. LCD monitors have rapidly gained popularity due their compact size, perfectly flat screen and superior image quality. In order for an LCD monitor to function equivalently to a CRT monitor, the LCD monitor must be able to display a variety of different input formats and resolutions. Since the LCD panel is itself a fixed resolution device, it is necessary for an image of lower resolution to be digitally resized in order to fill the display. The process of scaling an image can lead to the production of moiré as a result of interference between the input and output sample rates. The moiré effect typically manifests itself as regions of varying intensity superimposed on the underlying image so as to detract from its overall appearance.

Scaling an image from one resolution to another, as required in an LCD monitor, involves a process known as interpolation, whereby new pixels are generated in accordance with their spatial position relative to the input pixels. In general, new pixels are generated by blending between the values of neighboring input pixels, where the weightings are dependent on the position of the new pixel relative to the input pixels. It is a desirable property of an image interpolator that the total energy at the output resulting from an impulse having been applied to the input, remain relatively constant irrespective of the position of the impulse. For example, if the input is a single white pixel on a black background, then the sum of all the non-black pixels at the output that result from the input, should be more or less constant regardless of the position of the white pixel in the input. This property is desirable since it implies that a feature in the input image will appear in the output image with an intensity that does not vary based on its position. It is the lack of preservation of is this property that is often responsible for the appearance of moiré in LCD monitors. Indeed, many high quality interpolation schemes, particularly those based on the well known (sin x)/x function, attempt to preserve this property. However, since the light output from the physical display device (LCD or other fixed resolution device) is typically not directly proportional to the level of signal that is input to the display, this property is not necessarily preserved at the eye of the observer, resulting in the appearance of moiré. Consequently it is an object of the present invention, to provide a method and apparatus for reducing moiré in a digitally resized image.

The following patents are relevant as prior art relative to the present invention:
U.S. Patent Documents

| | | |
|---|---|---|
| 5,729,301 - Sluyterman | Mar 17/98 | Method and device for reducing moiré when displaying a video signal |
| 5,534,948 - Baldwin | Jul 9/96 | Method and apparatus for reducing the effect of alias components produced through non-linear digital signal processing, such as gamma correction, by by selective attenuation |
| 5,280,353 - Baldwin | Jan 18/94 | Method and apparatus for signal processing by interpolation and filtering with simultaneous frequency response compensation and offset generation |
| 5,303,055 - Hendrix | Apr 12/94 | Method and apparatus to improve a video signal |
| 5,764,216 - Tanaka | Jun 9/98 | Gamma correction circuit, a liquid crystal driver, a method of displaying image, and a liquid crystal display |

SUMMARY OF THE INVENTION

According to the present invention, a method and apparatus are provided for reducing the appearance of moiré in a digitally resized image. According to the invention, each input pixel value is mapped to a new value by means of a first correction function prior to being resized. At the output of the resizing engine, each pixel in the resized image is mapped to a further new value by means of a second correction function prior to being displayed. The second correction function is chosen such that the intensity of light output from the display device is substantially proportional to the value of the signal from the resizing engine, taking into account the combined transfer functions of the second correction means and the physical display device (i.e. the second correction function is substantially the inverse of the display transfer characteristic). The first correction function is chosen to be substantially the inverse of the second function, or in this case, equal to the display transfer characteristic itself. As will be shown later, this has the effect of reducing moiré that would otherwise appear in the presence of high spatial frequencies, while leaving the overall DC transfer characteristic unaffected.

Alternatively, the degree to which moiré is reduced may be altered by replacing the second correction function as described above with one that closer approximates a straight line (the generation of such a function is described below). Regardless, the first correction function is still chosen to be substantially the inverse of the second correction function as described above, but would no longer be equal to the display transfer characteristic itself. This alternative allows the degree of moiré reduction to be controlled while still preserving the overall DC transfer characteristic.

Yet another variation allows the overall DC transfer characteristic to be intentionally modified so as to achieve a desired response. Such modification may be desirable when an input video signal has been preconditioned for one type of display device (for example, a CRT device) and is displayed on a device with a different light transfer characteristic (for example, an LCD device). In this embodiment, the net modification to the overall DC transfer characteristic is made by altering the first correction function, so as to achieve independence between the level of moiré reduction and the amount by which the overall DC transfer characteristic is modified.

BRIEF DESCRIPTION OF THE DRAWINGS

A description of the prior art and of the preferred embodiments of the present invention is provided hereinbelow with reference to the following drawings in which:

FIG. 4 is a block diagram of an apparatus for implementing the method according to a first embodiment of the present invention.

FIG. 5 is a block diagram showing further details of an apparatus for implementing the method according to the embodiment of FIG. 4.

FIG. 12 is a block diagram of an apparatus in accordance with a preferred embodiment of the invention.

DESCRIPTION OF THE PREFERRED EMBODIMENTS

Figure 1:
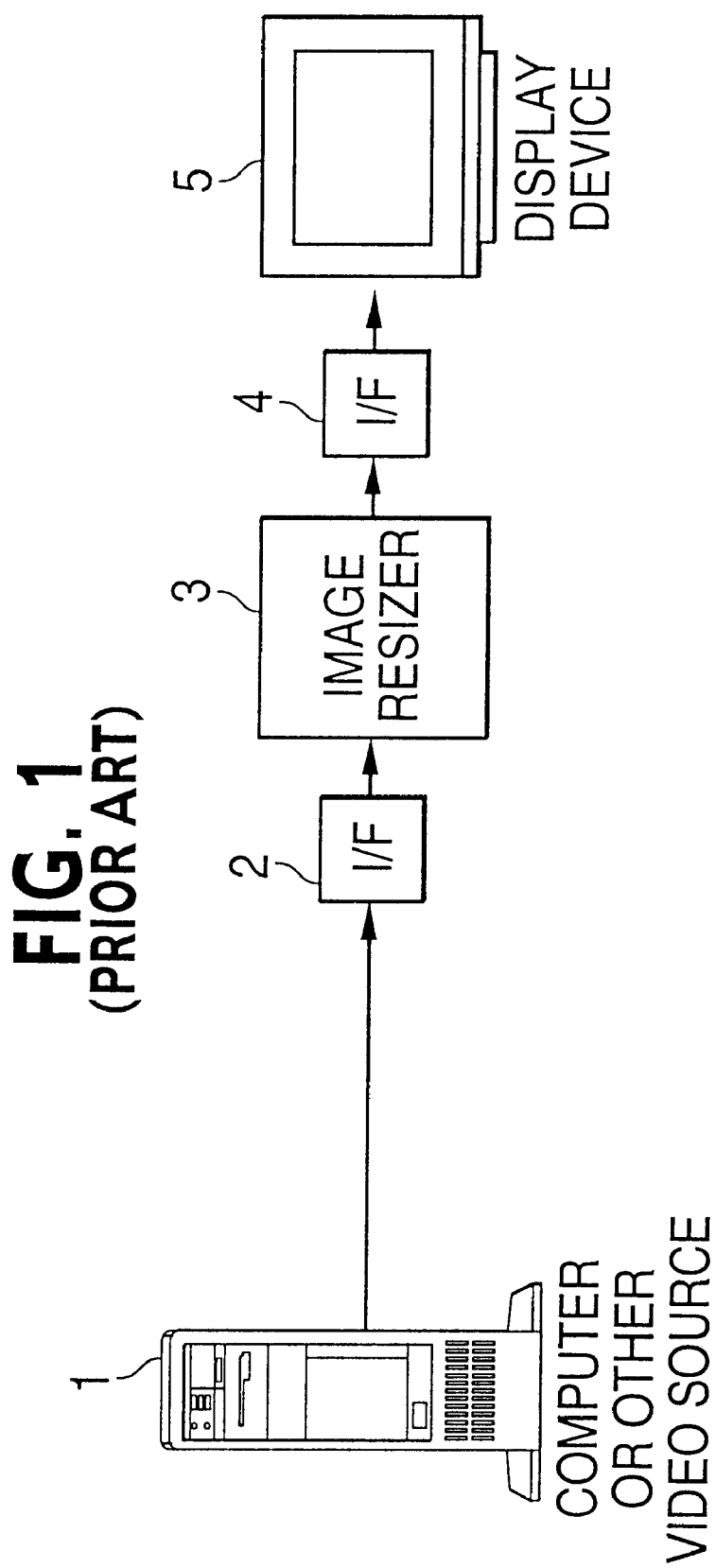
FIG. 1 is a block diagram showing how a digital image resizing engine may be connected between a video source and a video display device, according to the prior art.

Turning now to FIG. 1, a block diagram is provided which shows connection of an image processor between a video source and a physical display device (e.g. a flat panel monitor or other display system). The video source 1 may be a computer or other source device such as a video camera. The video signal output from the source device may conform to any of a number of standards. For example, it may be output in RGB analog format in accordance with the 15-pin VGA interface standard used with many personal computers, or in composite analog format in accordance with the National Television Standards Committee (NTSC) standard. Alternatively, the signal may be output in digital format, for example in accordance with the Digital Visual Interface (DVI) standard as set forth by the Digital Display Working Group (DDWG). Regardless of the format of the signal, an interface circuit 2 is used to receive the signal and present it in digital format to an image resizing engine 3. Where the signal is received in analog format, the interface circuit includes an analog-to-digital (A/D) converter for converting the signal to digital format. Where the signal is received in digital format in accordance with the DVI standard, I/F block 2 is a DVI receiver. DVI is a high speed serial interface and requires special sensing and PLLs to recover the signal and convert it to parallel digital format. On the display side, another standard known as LVDS is often used, in which case I/F block 2 would be an LVDS transmitter. The image resizing engine scales an input image of one resolution to produce an image of a second resolution as may be required by the physical display device, particularly where the display device has a fixed resolution as in the case of an LCD panel. The image resizing engine, by way of a second interface circuit 4, provides a signal to a display device 5 that is capable of forming an image. Where the display device is a CRT, the interface circuit would contain a digital-to-analog (D/A) converter for converting the signal to analog format. In the case of an LCD panel, the processed signal usually remains in digital format for transmission to the panel. In a flat panel monitor, items 2–5 are usually contained within the same housing.

Figure 2:
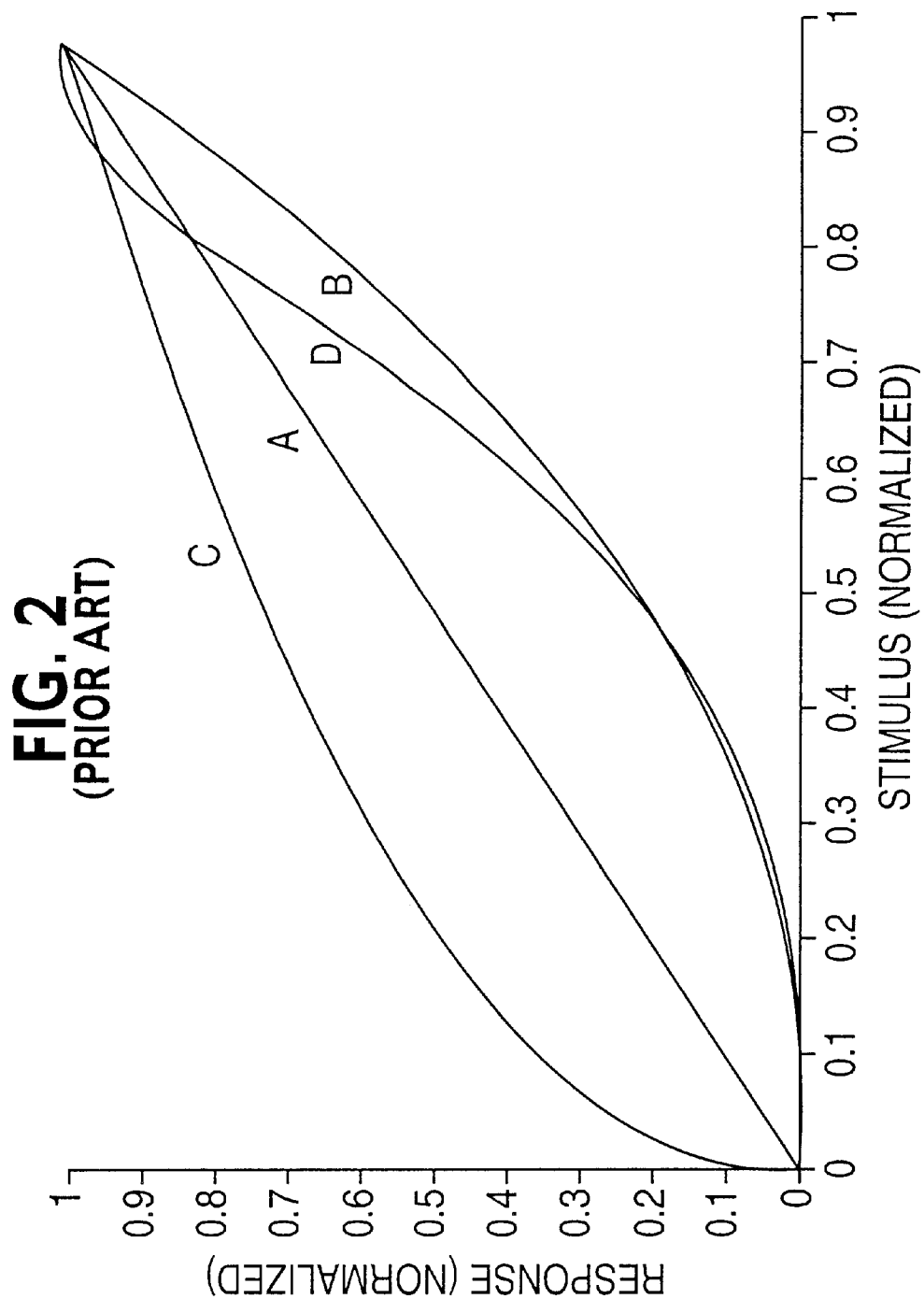
FIG. 2 is a plot of the normalized DC transfer characteristics of various image capture and display devices, according to the prior art.

Referring now to FIG. 2, we see some examples of the typical DC transfer characteristics of the various devices described above. All response curves in this and later figures have been normalized such that the values along the horizontal axis from 0 to 1, correspond to the full range of the possible input stimulus to each device. Similarly, the values along the vertical axis from 0 to 1, correspond to the full range of the possible output response from each device. Each point on a curve represents the value of the output for a given value of input. In FIG. 2, line A is a plot of the identity transfer function and is provided for reference only. Line B is a plot of the typical intensity of light output from a CRT for a given value of voltage at the input. Note that the intensity of light output from the CRT is not proportional to the input voltage but follows an exponential curve with an exponent of approximately 2.2. The response is a result of the physics of the CRT which turns out to have practical value in reducing the appearance of noise. This response is commonly referred to as the CRT gamma function. Line C is a plot of the typical voltage output from a video camera for a given level of light intensity at the input. Once again the relationship is not linear but follows an exponential curve with an exponent of approximately 0.45. The video camera and CRT have responses that are approximately inverse to each other such that the light output from the display is proportional to the light from the subject that originally falls on the camera. Historically, most video standards have developed such that the gamma characteristics of the signal at the interface are compatible with the response of a typical CRT. Modern standards for interfacing to computer displays including DVI have also adopted this principle for backwards compatibility. Finally, line D of FIG. 2 is a plot of the typical intensity of light output from an LCD panel for a given value of digital data at the input. Note that the response follows a somewhat more complex function than the simple exponential as in the case of a CRT.

Figure 3A:
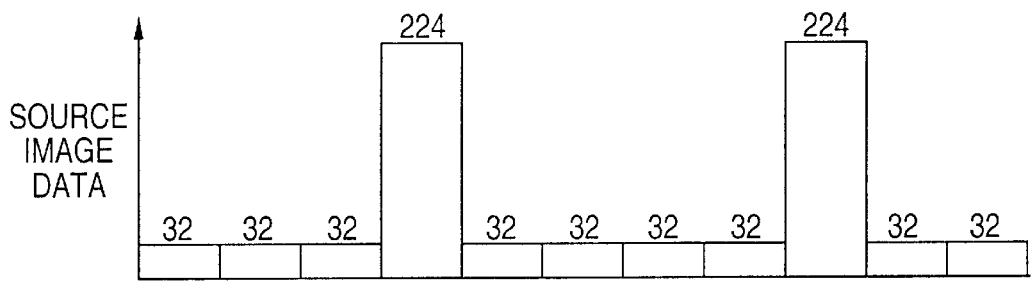
FIG. 3 is a schematic representation of how source image pixel data may be processed by a digital image resizing engine and converted to light energy by a display device, according to the prior art.
Figure 3B:
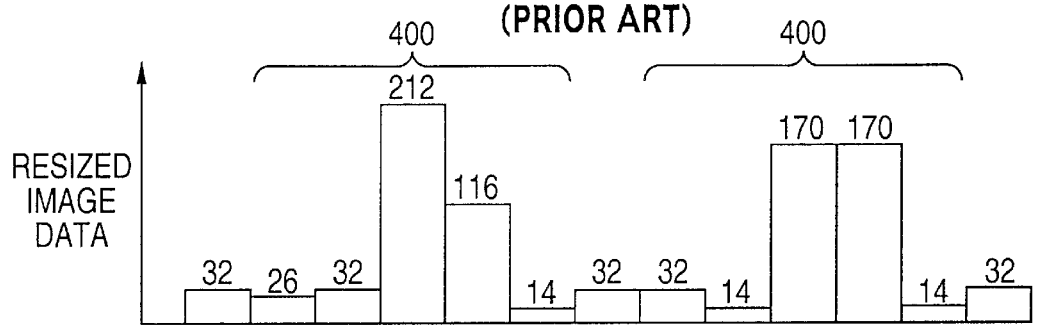
Figure 3C:
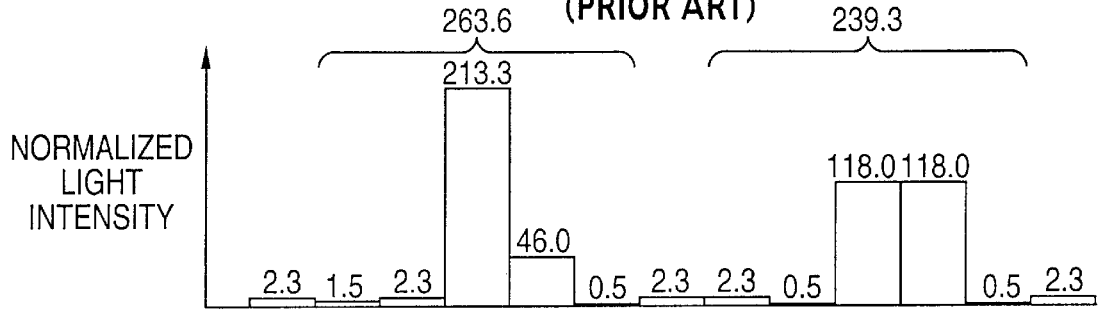

Turning now to FIGS. 3A–3C, schematic representations are set forth showing how the video signal is modified as it propagates from the source to the display device. FIG. 3A shows the values of a number of neighboring pixels within a single line of video emanating from a source device. In this example, there are two higher values representing brighter pixels on an otherwise darker background. Each of the bright pixels may be thought of as an impulse. FIG. 3B shows how the data values of FIG. 3A are manipulated by an image processor to effect resizing of the input image in preparation for display on a device with higher resolution than that of the source. Note that the samples in FIG. 3B are more closely spaced than those in FIG. 3A, since the resizing engine generates additional pixels in order to fill the higher resolution display. The alignment between the samples of FIG. 3A and the samples of FIG. 3B is not fixed but changes at each position due to the fact that the data has been spatially resized. Regardless, it is desirable that the images perceived by the viewer of each of the two impulses appear similar since they originated as pulses of equal weighting. In keeping with the above, it is a desirable property of an image resizing engine that pulses which have equal weighting at the input also have equal weighting at the output. Indeed, this property is preserved by the image resizing engine used to generate the pixel values in the example of FIG. 3B, as can be seen from the fact that the five pixel values in the vicinity of each of the impulses sums to 400 in both cases.

FIG. 3C shows the normalized light intensity that results when the pixel values in FIG. 3B are applied to an LCD panel with a characteristic transfer function as shown in FIG. 2D. Note that the total light energy output from the two pulses is no longer equal and the viewer will perceive them as having different weights. It is precisely this behaviour that can result in the production of moiré when images with high spatial frequency content are resized, since the perceived weighting of a pulse changes as the positions of the output sample points change with respect to the input sample points.

FIG. 4 is a block diagram of an apparatus that implements an embodiment of the present invention and that overcomes the limitations of the prior art described above. For convenience, the same numbers have been used to identify those parts that are in common with the system of FIG. 1. In FIG. 4, an input correction block 6 has been added prior to the image resizing engine 3, and an output correction block 7 has been added subsequent to the image resizing engine.

FIG. 5 shows additional detail associated with each of the two correction blocks. Since computer displays commonly make use of three separate colour components, each correction block is further divided into a RED channel, a GREEN channel and a BLUE channel. The correction for each channel may be performed using a look up table (LUT) where a value at the input is mapped to a new value by looking it up in the table. LUTs for the RED, GREEN and BLUE channels are shown in FIG. 5 as items 8–10, respectively. The contents of each LUT may be initialized or updated under the control of a microprocessor. Alternatively, the two correction functions may be represented parametrically and the corrections implemented accordingly.

Figure 6:
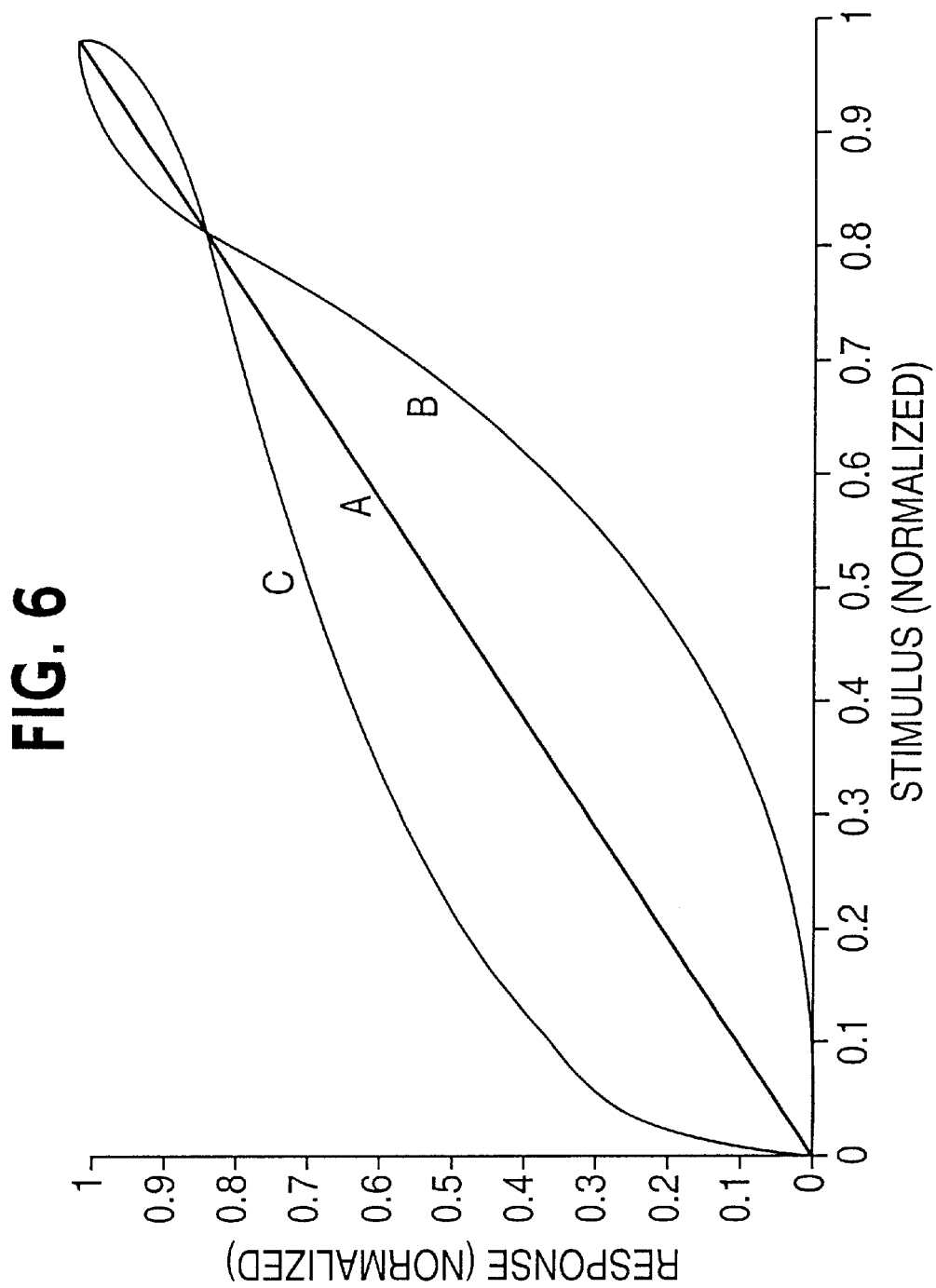
FIG. 6 is a plot of the normalized DC transfer characteristics of the input and output correction blocks that are part of the apparatus according to the embodiment set forth in FIGS. 4 and 5.

FIG. 6 shows an example of how specific input and output correction curves may be used to advantage in an embodiment of the present invention. Line A is a plot of the identity transfer function and is provided for reference only. Line B is a plot of the typical intensity of light output from an LCD panel for a given value of digital data at the input. Line C is a function that is substantially the inverse of line B and it is the function shown in line C that is programmed in the output correction block 7 in FIG. 4. Thus, the output correction function effectively cancels the light transfer characteristic of the display device such that the level of light output from the display is linearly proportional to the pixel values from the image resizing engine 3 in FIG. 4. Hence, the impulse response perceived by the viewer will be spatially invariant and the production of moiré will be substantially avoided.

Figure 7A:
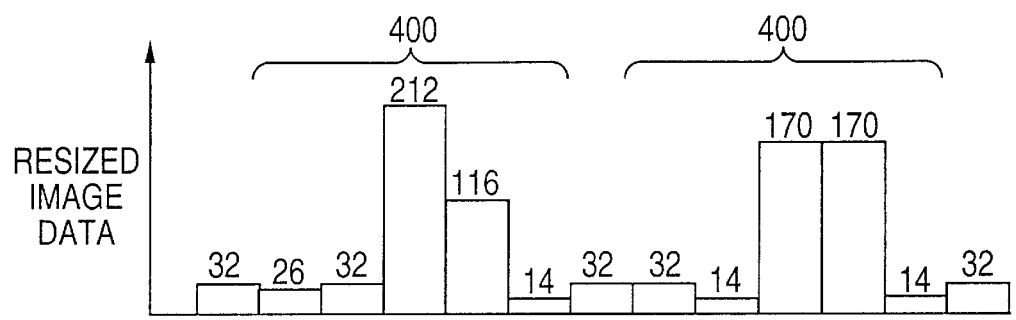
FIG. 7 is a schematic representation of how source image pixel data are processed and converted to light energy by a display device, according to he embodiment of the present invention set forth in FIGS. 4, 5 and 6.
Figure 7B:
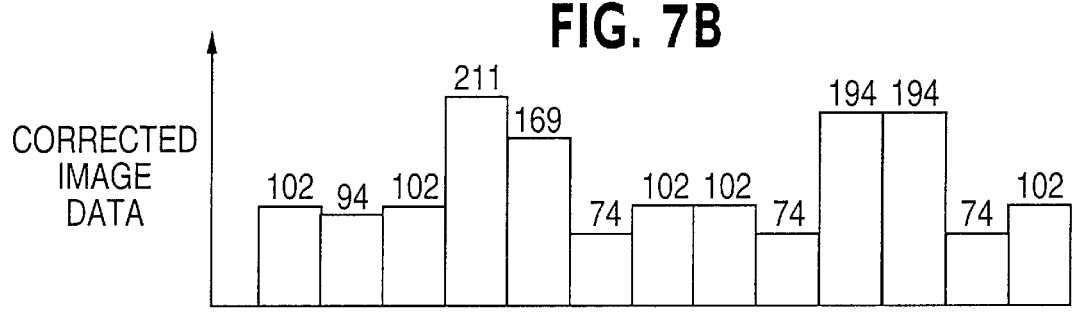
Figure 7C:
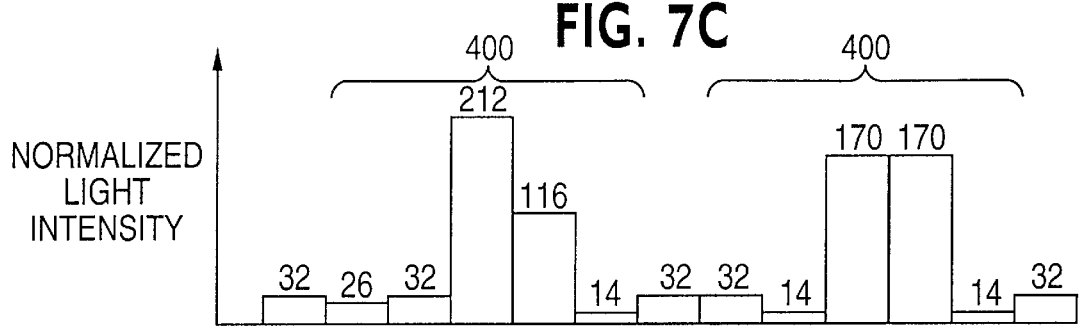

The effect of the output correction function can be seen by considering how the video signal is modified as it propagates from the image resizing engine to the display device. FIG. 7A is the equivalent to FIG. 3B in that it shows the pixel values output by the image resizing engine in response to two impulses of equal amplitude at the input, where the total value of the pixels associated with two impulse responses is equal. FIG. 7B shows the subsequent pixel values after processing by the output correction block 7 where the block has been programmed with the function depicted by line C in FIG. 6. FIG. 7C shows the normalized light intensity that results when the pixel values in FIG. 7B are applied to the display device 5 with a characteristic transfer function depicted by line B in FIG. 6. Note that the total light energy output from the two pulses is equal and the viewer will perceive them as having the same weight.

Programming the output correction function as described above without taking any other measures effectively reduces the appearance of moiré but also results in an undesired alteration of the overall DC transfer characteristic. That is to say, the level of light emitted from the display for a given flat field (constant valued) input will change in accordance with the output correction function. In order to avoid this effect, it is necessary to program the input correction block 6 with a second correction function which is the inverse of the output correction function. In the present example (where the output correction function is the inverse of the display transfer function), the first correction function is substantially equal to the transfer characteristic of the display itself, as shown by line B in FIG. 6. Thus, by applications of the indicated correction functions to blocks 6 and 7 the production of moiré associated with scaling is reduced while the overall DC transfer characteristic of the display system remains unaltered.

The reduction of moiré through application of the preferred embodiment of the present invention set forth above is generally beneficial, for the reasons indicated. However, there are circumstances in which it may be desirable to apply the technique of the present invention to a lesser extent. It has already been illustrated that application of the principles characterizing the present invention results in the weighting of pulses so as to reproduce a video signal at the display device 5 which is faithful to the input video signal. In prior art techniques, negative pulses have tended to be over-emphasized, since the intensity of light from intermediate valued pixels near the edges of the pulses in the resized image is reduced as a result of the display response. For example, black text on a white background tends to appear more bold using prior art techniques, which to many people would be considered an enhancement. Application of the preferred embodiment of the present invention as set forth above would, in such a case, tend to de-emphasize the black text, although technically speaking the black text would be "correctly" emphasized. In order to accommodate different viewer preferences, a further aspect of the present invention allows for user control of the degree to which moiré is reduced.

It has already been demonstrated above that failure to perform any correction at the output of the resizing engine 3 can result in the production of moiré, which is eliminated according to the preferred embodiment by programming an output correction function that is the inverse of the display transfer function. Since the identity transfer function results in no correction, it follows that the degree of correction can be controlled by programming a transfer function that falls between the identity transfer function (i.e. a straight line with y=x) and the inverse of the display characteristic.

Figure 8:
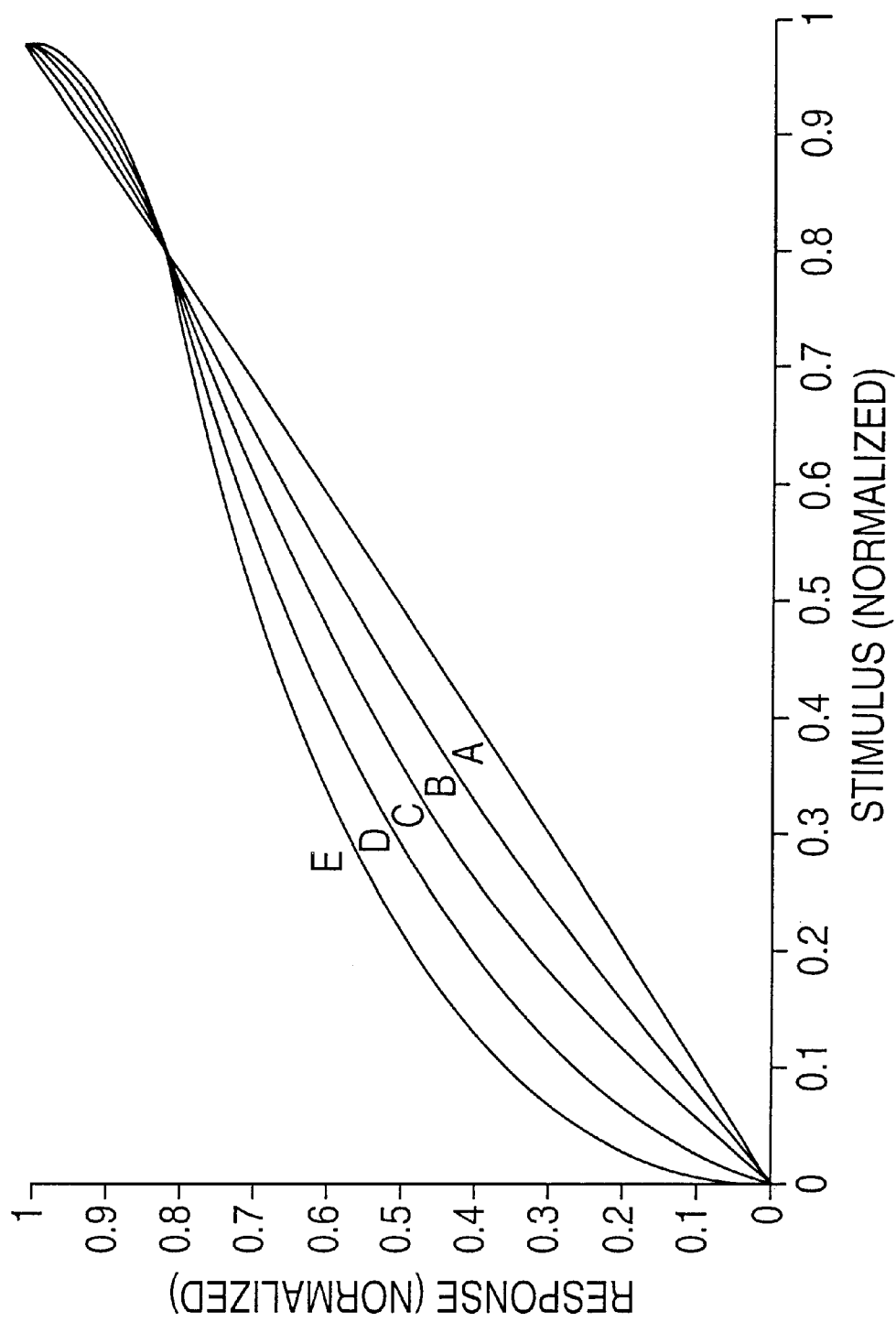
FIG. 8 is a plot of the normalized DC transfer characteristic of the output correction block according to a second embodiment of the present invention.
Figure 9:
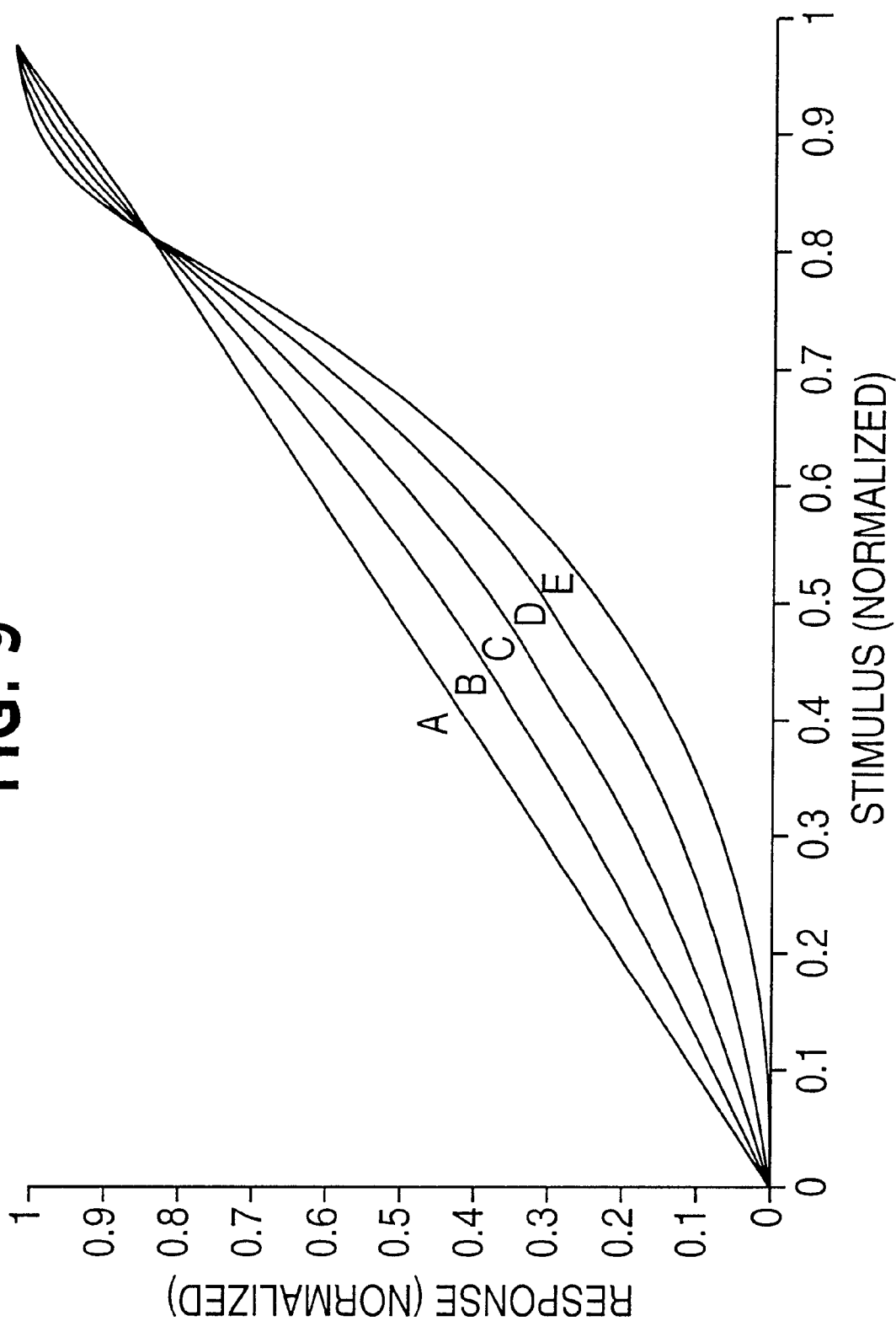
FIG. 9 is a plot of the normalized DC transfer characteristic of the input correction block according to the second embodiment of the present invention.

A family of curves corresponding to various degrees of output correction is shown in FIG. 8 by lines A–E. Line A is the identity transfer function and corresponds to no correction. Line E is the inverse of the display characteristic and corresponds to the maximum or "perfect" amount of correction. Lines B–D are interpolations between lines A and E representing various degrees of correction. In the example of FIG. 8, the intermediate lines were generated such that for each level of stimulus, the corresponding point on the interpolated line is calculated by taking a weighted average between the corresponding points on lines A and E. In order that the overall DC transfer characteristic remain unaffected, it is necessary to program the input correction block 6 with the inverse of whatever function is programmed in the output correction block 7, as discussed above. Thus, lines A–E in FIG. 9 show a family of input correction curves corresponding to the inverse of the output correction curves shown in FIG. 8, lines A–E, respectively.

As indicated briefly above, a video signal is typically conditioned for display on a device with a response similar to that of a CRT. Since the response of an LCD panel is different from that of a CRT, it is desirable to correct for the difference such that the image appears as originally intended. This can be accomplished by modifing either the input or output correction function such that the overall transfer function from the video signal input to the display output results in correct gamma function conditions of the video signal. Thus, according to another aspect of the present invention, the input correction function is modified to produce the desired net change to the overall DC transfer function. The modification is made at the input correction block 6, rather than at the output correction block 7, in order to maintain apparent independence from the viewer's perspective between modification of the level of moiré cancellation and modification of the overall DC response. Otherwise, modification of the output correction function would also affect the level of moiré cancellation.

Figure 10:
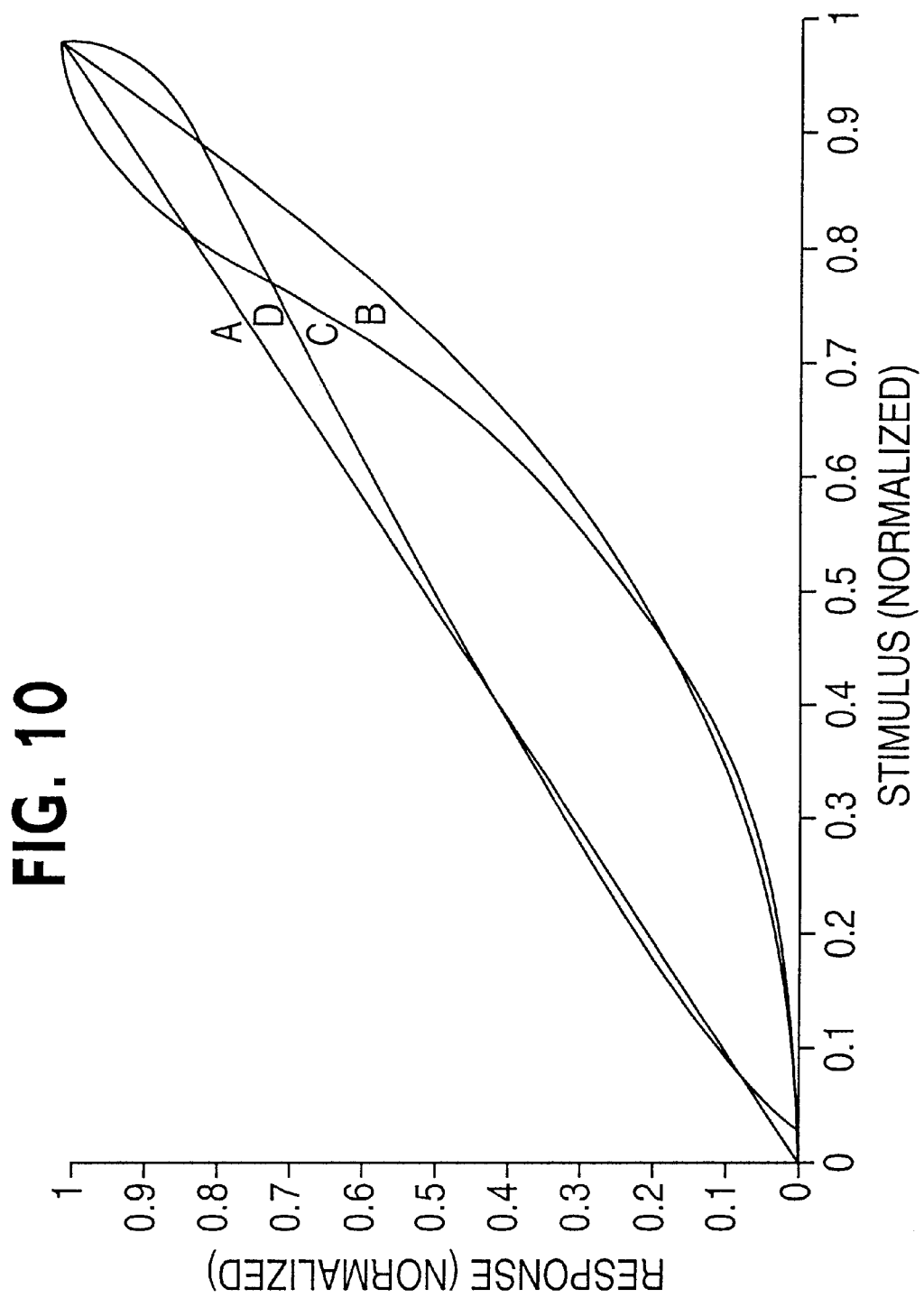
FIG. 10 is a plot of the normalized DC transfer characteristic of the input and output correction blocks according to a third embodiment of the present invention.

Referring now to FIG. 10, line A is a plot of the identity transfer function that has been programmed in the output correction block and which results in no reduction in the amount of moiré produced. Line B is a plot of the overall DC transfer characteristic of the display system that is to be achieved and which approximates that of a typical CRT device (i.e. the CRT gamma function). Line C is a plot of the light transfer characteristic of the non-CRT display device (LCD panel, in this case). Line D is a plot of the correction function that must be programmed in the input correction block 6 in order to achieve the desired overall DC response depicted in line B.

Figure 11:
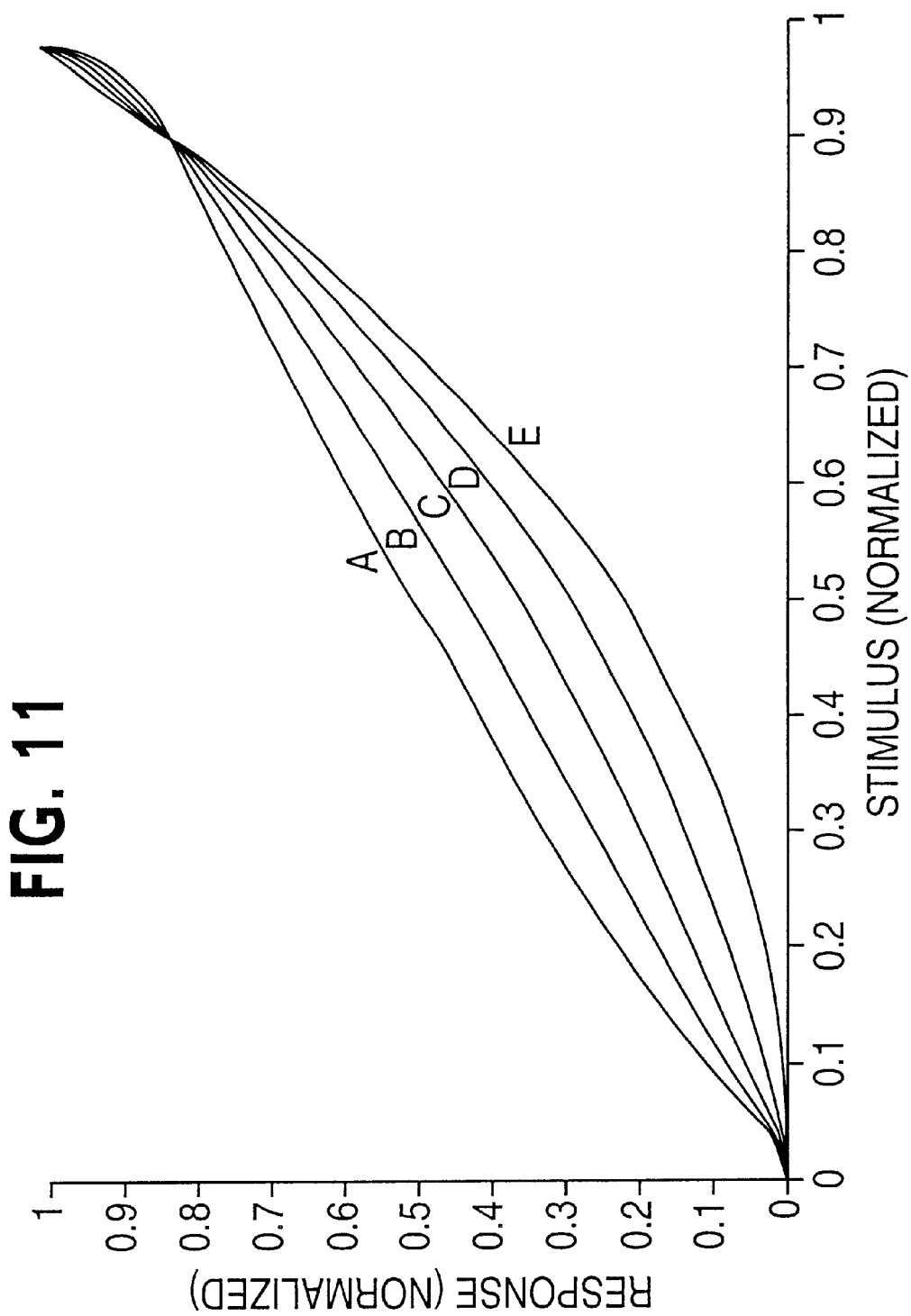
FIG. 11 is a plot of the normalized DC transfer characteristic of the input correction block according to the third embodiment of the present invention.

In order to provide a viewer with the greatest amount of flexibility in adjusting the display to suit his or her needs, it is desirable to allow both the level of moiré cancellation and the overall DC response of the display system to be controlled independently by the viewer. As described earlier, lines A–E in FIG. 8 show a family of output correction curves corresponding to various levels of moiré cancellation for a display device with a response. as shown by line B in FIG. 6 and by line C in FIG. 10. The desired response depicted as line B in FIG. 10 can then be achieved by programming the input correction block 6 with one of the correction curves shown as lines A–E in FIG. 11 corresponding to the output correction curves shown as lines A–E in FIG. 8.

From the foregoing, it will be readily apparent that the level of moiré can be controlled by manipulating the output correction function only (i.e. moiré is not directly dependent on the input correction function). The input correction function may therefore be selected as that which gives a desired overall display system response, and is dependent on both the output correction function and the response of the physical display. FIG. 12 shows a block diagram of a systen that allows the level of moiré reduction as well as the overall display system response to be independently controlled by the viewer. For convenience, the same numbers have been used to identify those parts that are in common with the system of FIG. 4. In response to a user supplied level of moiré reduction, an output correction function calculator 9 calculates an appropriate output correction function based on the user supplied input and the response of the physical display, which is assumed to be known. In response to a user specified system display response, for example which may be selected from among a number of pre-determined alternatives, an input correction function calculator 8 calculates an appropriate input correction function based on the user supplied input, the previously determined output correction function and the known response of the physical display. The computed input and output correction functions are then loaded into the input and output correction blocks by means of a microprocessor interface or other suitable means.

In a preferred embodiment of the present invention, user input concerning the selection of moiré reduction level and display system response is made by way of an On-Screen Display (OSD). A microprocessor receives the user input and generates appropriate input and output correction functions. On-the-fly generation of the appropriate correction functions requires fairly complex software that can be difficult to implement on a low cost micro-controller, such as that typically utilized in a flat panel monitor. Thus, as an alternative, it is possible to have all of the required correction curves pre-calculated and stored in a ROM, such that the micro-controller need only select the appropriate functions based on the user input and load them into the appropriate correction blocks from the ROM.

A person understanding the present invention may conceive of other embodiments and variations thereof without departing from the sphere and scope of the invention as defined by the claims appended hereto.

We claim:

1. Apparatus for adjusting the level of moiré in an image which has been digitally resized by an image resizing engine for display on a display device, comprising:

an input correction block connected to an input of the image resizing engine for mapping each input pixel value of said image to a new value by means of a first transfer function prior to being resized by said resizing engine; and an output correction block connected to an output of the image resizing engine for mapping each pixel value of a signal output from said image resizing engine to a further new value by means of a second transfer function prior to being displayed by said display device, and whereby said second transfer function is chosen so as to adjust the level of moiré in said image and said first transfer function is chosen so as compensate for changes in overall DC response of said display device resulting from said adjustment of the level of moiré.

2. The apparatus of claim 1, further comprising an output correction calculator for receiving a first user input of a desired level of moiré and in response generating said second transfer function which is variable between the identity transfer function giving rise to no moiré adjustment and the inverse of a normalized transfer function for said display device which results in perfect moiré cancellation.

3. The apparatus of claim 2, further comprising an input correction transfer function calculator for receiving a second user input of a desired display system response and one of either said second transfer function or said first user input and in response generating said first transfer function which is variable for optimizing overall DC response of said display device.

4. The apparatus of claim 3, wherein each of said input correction block and said output correction block comprises look-up table means for storing said first transfer function and said second transfer function, respectively.

5. The apparatus of claim 4, wherein each of said look-up table means further comprises separate red, green and blue transfer function look-up tables for mapping red, green and blue pixels, respectively.

6. A method of adjusting the level of moiré in an image which has been digitally resized by an image resizing engine for display on a display device, comprising the steps of:

mapping each input pixel value of said image to a new value by means of a first transfer function prior to being resized by said resizing engine; and mapping each pixel value of a signal output from said image resizing engine to a further new value by means of a second transfer function prior to being displayed by said display device, and whereby said second transfer function is chosen so as to adjust the level of moiré in said image and said first transfer function is chosen so as compensate for changes in overall DC response of said display device resulting from said adjustment of the level of moiré.

7. The method of claim 6, further comprising the steps of receiving a first user input of a desired level of moiré and in response generating said second transfer function which is variable between the identity transfer function giving rise to no moiré adjustment and the inverse of a normalized transfer function for said display device which results in perfect moiré cancellation.

8. The method of claim 7, further comprising the steps of receiving a second user input of a desired display system response and one of either said second transfer function or said first user input and in response generating said first transfer function which is variable for optimizing overall DC response of said display device.

9. The method of claim 8, wherein said steps of generating each of said first transfer function and said second transfer function, further comprise the steps of storing said transfer functions in separate red, green and blue transfer function look-up tables for mapping red, green and blue pixels, respectively.

* * * * *